United States Patent
Davoust et al.

(10) Patent No.: US 10,587,593 B2
(45) Date of Patent: *Mar. 10, 2020

(54) REOCCURRING KEYING SYSTEM

(71) Applicant: Comcast Cable Communications, LLC, Philadelphia, PA (US)

(72) Inventors: Nancy Davoust, Louisville, CO (US); James Fahrny, Parker, CO (US); Kevin Taylor, Parker, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/911,330

(22) Filed: Mar. 5, 2018

(65) Prior Publication Data

US 2019/0020639 A1 Jan. 17, 2019

Related U.S. Application Data

(63) Continuation of application No. 14/186,863, filed on Feb. 21, 2014, now Pat. No. 9,948,623, which is a continuation of application No. 13/221,035, filed on Aug. 30, 2011, now Pat. No. 8,713,314.

(51) Int. Cl.
*G06F 21/44* (2013.01)
*H04L 29/06* (2006.01)
*H04L 9/08* (2006.01)

(52) U.S. Cl.
CPC .......... *H04L 63/062* (2013.01); *H04L 9/0891* (2013.01); *H04L 63/06* (2013.01); *H04L 63/12* (2013.01); *H04L 63/20* (2013.01); *H04L 63/10* (2013.01)

(58) Field of Classification Search
CPC ....... H04L 63/062; H04L 63/12; H04L 63/06; H04L 9/0891; H04L 63/20; H04L 63/10
USPC ........................................................ 713/168
See application file for complete search history.

(56) References Cited

U.S. PATENT DOCUMENTS

| | | | |
|---|---|---|---|
| 7,050,789 B2 | 5/2006 | Kallio et al. | |
| 7,107,247 B2 | 9/2006 | Kinoshita et al. | |
| 7,373,512 B1* | 5/2008 | Just | H04L 63/0823 713/176 |
| 7,787,622 B2* | 8/2010 | Sprunk | H04N 7/163 380/37 |
| 8,302,153 B1 | 10/2012 | Garrity et al. | |
| 8,321,584 B2 | 11/2012 | Dobbins | |
| 8,352,725 B1 | 1/2013 | O'Toole, Jr. | |
| 8,582,779 B2 | 11/2013 | Messerges et al. | |
| 8,625,803 B1 | 1/2014 | Radhakrishnan et al. | |

(Continued)

OTHER PUBLICATIONS

"Device pairing using the issued key from authority or provider and establishing secure communication and key table with certificate," Google Scholar. Website: http://scholar.google.com/ . . . device+pairing+using+the+issued+key+from+authority+or+provider+and+establishing+secure+communication+and+key+table+with+cetificate+&hl=en&as_sdt=0%2C47, retrieved May 14, 2013.

*Primary Examiner* — Abu S Sholeman
(74) *Attorney, Agent, or Firm* — Banner & Witcoff, Ltd.

(57) ABSTRACT

Methods, systems, and apparatuses are described for secure communications. One of a plurality of keys with respective key types may be used to establish a secure communication between computing devices. Verification of an establishment of the secure communication may be sent to a trusted computing device.

33 Claims, 9 Drawing Sheets

(56) References Cited

U.S. PATENT DOCUMENTS

| | | | |
|---|---|---|---|
| 8,788,825 B1 | 7/2014 | Le et al. | |
| 8,924,722 B2 | 12/2014 | Horn et al. | |
| 9,282,455 B2 | 3/2016 | Aissi et al. | |
| 9,319,224 B2 | 4/2016 | Nemiroff et al. | |
| 2003/0056099 A1 | 3/2003 | Asanoma et al. | |
| 2003/0070092 A1 | 4/2003 | Hawkes et al. | |
| 2003/0130947 A1 | 7/2003 | Benantar | |
| 2004/0044891 A1 | 3/2004 | Hanzlik et al. | |
| 2004/0044897 A1 | 3/2004 | Lim | |
| 2004/0158704 A1 | 8/2004 | Oates et al. | |
| 2005/0086479 A1 | 4/2005 | Ondet et al. | |
| 2005/0226416 A1 | 10/2005 | Jung et al. | |
| 2006/0048232 A1 | 3/2006 | Jung et al. | |
| 2006/0059573 A1 | 3/2006 | Jung et al. | |
| 2006/0107050 A1 | 5/2006 | Shih | |
| 2006/0248595 A1 | 11/2006 | Kelly | |
| 2006/0259965 A1* | 11/2006 | Chen | H04L 9/3226 726/20 |
| 2007/0113078 A1 | 5/2007 | Witt et al. | |
| 2007/0118875 A1 | 5/2007 | Chow et al. | |
| 2007/0223706 A1 | 9/2007 | Gantman et al. | |
| 2007/0242830 A1 | 10/2007 | Conrado et al. | |
| 2007/0283420 A1 | 12/2007 | Rantalahti | |
| 2007/0297613 A1 | 12/2007 | Ghosh | |
| 2008/0022392 A1 | 1/2008 | Karpati et al. | |
| 2008/0049934 A1 | 2/2008 | Onoda et al. | |
| 2008/0072038 A1 | 3/2008 | Yi et al. | |
| 2008/0133414 A1 | 6/2008 | Qin et al. | |
| 2008/0170693 A1 | 7/2008 | Spies et al. | |
| 2008/0304661 A1 | 12/2008 | Kato et al. | |
| 2010/0042838 A1 | 2/2010 | Ho | |
| 2010/0058060 A1 | 3/2010 | Schneider | |
| 2010/0095126 A1 | 4/2010 | Masui et al. | |
| 2010/0142711 A1 | 6/2010 | Weis et al. | |
| 2010/0246824 A1 | 9/2010 | Xiao et al. | |
| 2010/0280880 A1 | 11/2010 | Faith et al. | |
| 2011/0013773 A1* | 1/2011 | Pinder | G06F 21/602 380/210 |
| 2011/0103589 A1 | 5/2011 | Tie et al. | |
| 2011/0208803 A1 | 8/2011 | McCoy et al. | |
| 2011/0211693 A1 | 9/2011 | Carvalho et al. | |
| 2011/0271106 A1 | 11/2011 | Hinkle et al. | |
| 2011/0307945 A1 | 12/2011 | Huang | |
| 2012/0011360 A1 | 1/2012 | Engels et al. | |
| 2012/0030461 A1 | 2/2012 | Willey et al. | |
| 2012/0072731 A1 | 3/2012 | Winograd et al. | |
| 2012/0079577 A1 | 3/2012 | Hao | |
| 2012/0159159 A1 | 6/2012 | Messerges et al. | |
| 2012/0222135 A1* | 8/2012 | Chavez | H04N 21/4104 726/29 |
| 2013/0031369 A1 | 1/2013 | Balinsky et al. | |
| 2014/0068744 A1 | 3/2014 | Bran et al. | |
| 2014/0289521 A1 | 9/2014 | Davoust et al. | |
| 2017/0235967 A1 | 8/2017 | Ray et al. | |

* cited by examiner

REOCCURRING KEYING SYSTEM

This application is a continuation of U.S. patent application Ser. No. 14/186,863, filed Feb. 21, 2014, which is a continuation of U.S. patent application Ser. No. 13/221,035, filed Aug. 30, 2011, the specifications for which are hereby incorporated by reference in their entirety.

FIELD OF ART

The features described herein relate generally to communication security in systems that control access. Some aspects relate to key-based security.

BACKGROUND

Security has long been a vital aspect of communications, and our increasing reliance on networks such as the Internet will only heighten the importance of keeping communications secure. One common approach to securing communications is through encryption. With encryption, the message being sent is subjected to an algorithm and modified, so that the resulting encrypted message is unintelligible to anyone who does not know the secret to decrypting the message (e.g., to undoing the algorithm). Many encryption techniques rely on a key that is uniquely assigned to a sender of the message, and the sender uses that key as part of the algorithm to encrypt outgoing messages. Recipients may have the same key, or (depending on the algorithm) they may have a different key and/or algorithm that will allow them to reverse the encryption and decrypt the message.

The encryption algorithm and key may be assigned from a trusted party. An entity may do its best to keep the algorithm and/or key a secret, but as long as communication traffic can be intercepted, for example, there will likely be hackers attempting to crack into the secure communications. Accordingly, there remains an ever-present need for improved methods of securing data for communication.

SUMMARY

Some or all of the various features described herein may assist in preventing security compromises, and/or in reducing the inconvenience to users (as well as service providers, content owners, device manufacturers) when a security compromise occurs.

In some embodiments herein, a secure communication system may impose a policy on its participant that requires the participants to establish and maintain a constant level of trust with a master authority in the system, so that each time a key is used, the user understands that the key is currently valid. The constant level of trust may involve, for example, the participating entities seeking key validation from the master authority (or a designated representative of the master authority) every time the entity wishes to take an action that requires use of a key.

In one aspect, the policy may impose use- and/or entity-specific keys. For example, a first entity may be given a key (or set of keys) to be used when taking certain actions with one entity, and a different key (or set of keys) to be used when taking those actions with a different entity. In this way, the entities may be paired by the master authority for authorized communication with one another.

In another aspect, the keys may be transmitted in the form of data structures that have various key parameters, such as a count of the number of keys and/or number of pairings, usage information indicating what a particular key is allowed to be used for. In some embodiments, the keys may be rolled over or renewed to change the key values or usages.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1A:
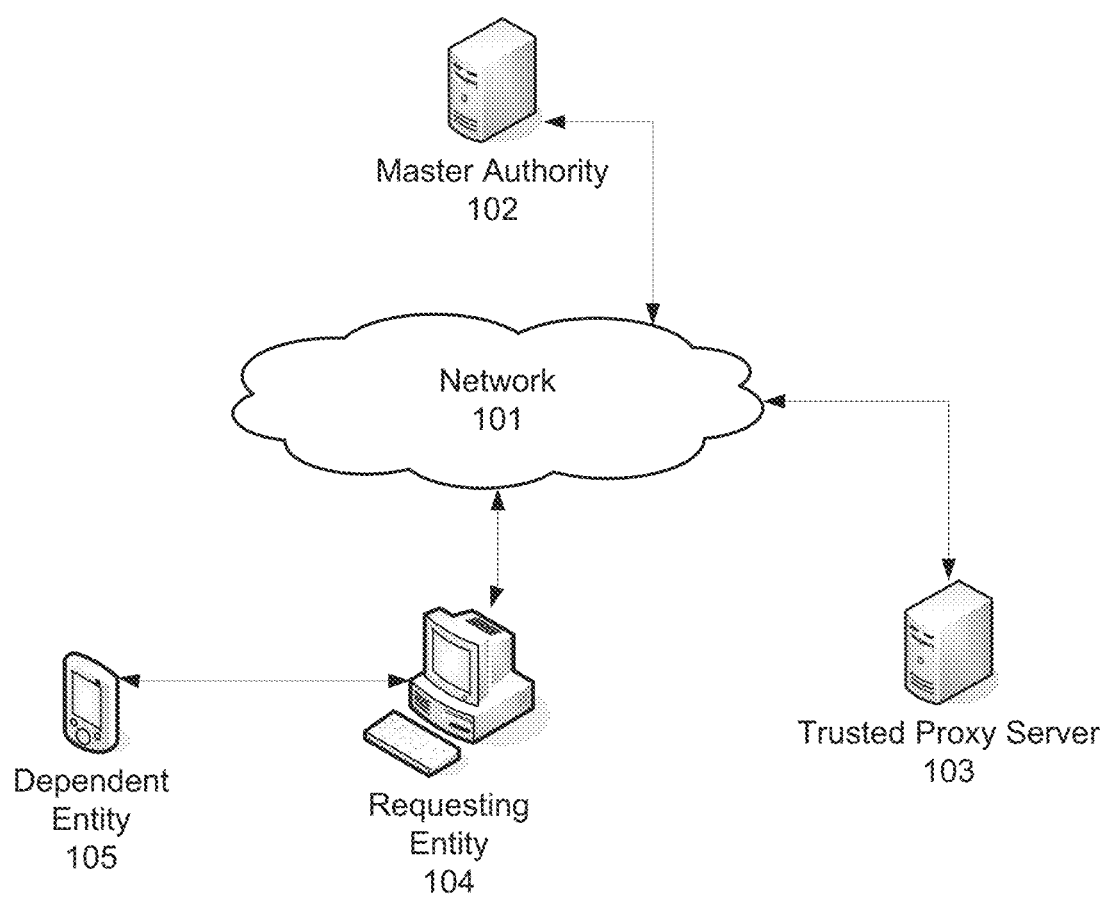
FIG. 1a illustrates an example communication network on which various features described herein may be used.

FIG. 1 illustrates an example communication network 101, on which various security features disclosed herein may be implemented. The network 101 can be any desired type of communication network, such as optical fiber, coaxial cable, hybrid fiber/coax, telephone twisted pair, wireless, cellular telephone, satellite, etc., or any combination thereof. Various devices may be connected to, or have access to, the network 101, and may use the network 101 to communicate.

One such device or entity may be the Master Authority server 102. The Master Authority server 102 may be a computing device, or collection of devices, that is a trusted entity in a security scheme. The Master Authority can oversee all keys within the system to manage each key's usage and its lifecycle, among other functions. A reoccurring keying system disclosed herein can use the Master Authority as the enabler and enforcer of key usage.

Another device or entity may be a Trusted Proxy 103. The Trusted Proxy 103, which may be a server or other computing device, may act as an intermediary for secure communications between the Master Authority 102 and other devices that require the Master Authority 102's involvement or assistance. The system may employ, for example, multiple Trusted Proxies 103 may be distributed among different geographic regions of the country, and those proxy servers may be trusted to handle more granular level transactions. For example, the Master Authority 102 may be responsible for overseeing overall security and managing key structures, but distributed proxies 103 can be empowered to act on behalf of the Master Authority for certain day-to-day operations within certain domains (e.g., different Internet sites may be handled by different proxies 103). Either or both of these devices can act to manage security in the system described. Other specific examples are discussed further below.

The system may include a plurality of Requesting Entities 104, each of which can be any computing device that is capable of communication on or accessing network 101 with other Requesting Entities 104, the Trusted Proxy 103, and/or the Master Authority 102. As will be discussed further below, these entities may request authorization from the Proxy Servers 103 and/or Master Authority 102 before engaging in secure communications. Requesting Entities 104 may be, for example, personal computers, home access gateways, video set-top boxes (STB), digital video recorders (DVRs), processors, processing cards, modems, telephones, cellular telephones, smart phones, routers, wireless devices, mobile televisions, satellite transceivers, and any other desired type of communicating device.

In addition to Requesting Entities 104, the system may include one or more Dependent Entities 105. A Dependent Entity 105 may be any desired communication device that uses another device (e.g., another Requesting Entity 104) to access the network 101, Proxy Server 103 and/or Master Authority 102 for the secure communication authorizations described herein. Example Dependent Entities 105 may be processing cards (e.g., video content access Cablecards, computing expansion circuits, etc.), computer peripherals (e.g., printers, modems, display monitors, keyboards, mice, etc.), local devices in a premise (e.g., portable device connected via wifi or Bluetooth), mobile devices (e.g., cell phones and smart phones, portable computers) or other computing devices that are communicatively coupled to a Requesting Entity 104. Additionally, the kinds of devices that can serve as Requesting Entities 104 can also be Dependent Entities 105 when, for example, they don't happen to have an active communication connection to network 101, or are configured to not use such a connection for a particular communication. In some embodiments, the requesting and dependent entities 104/105 may be application specific integrated circuits (ASICs) that are internal components to a larger device, such as a computer, gateway, or the other devices noted above. An example use case can involve a dependent entity (e.g., a smart phone) that wishes to communicate with a requesting entity (e.g., a home gateway) in a secure fashion.

Figure 1B:
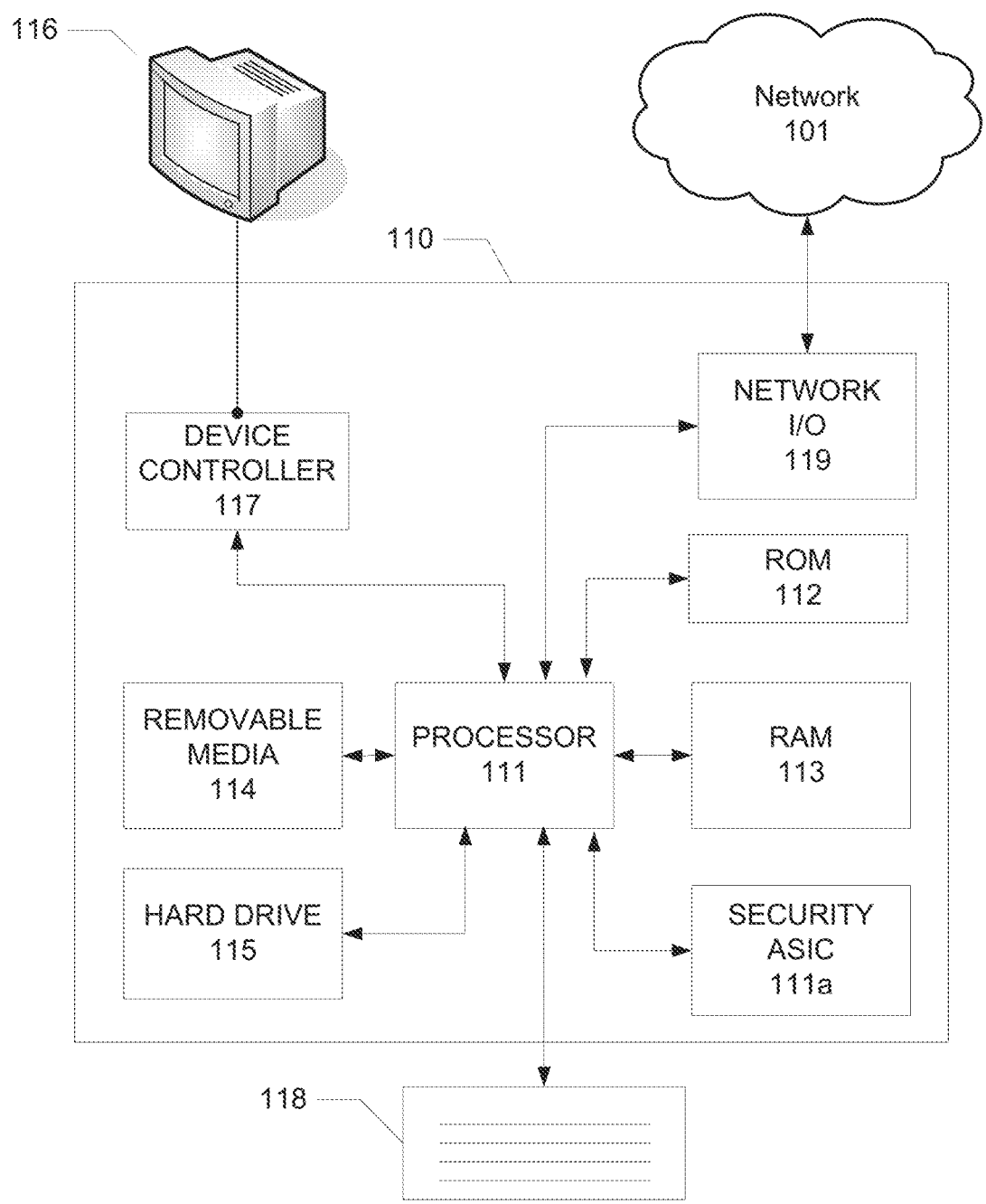
FIG. 1b illustrates an example computing hardware configuration that can be used to implement any of the servers, entities and computing devices described herein.

FIG. 1b illustrates general hardware elements that can be used to implement any of the various computing devices, servers and entities discussed herein. The computing device 110 may include one or more processors 111, which may execute instructions of a computer program to perform any of the features described herein. The instructions may be stored in any type of computer-readable medium or memory, to configure the operation of the processor 111. For example, instructions may be stored in a read-only memory (ROM) 112, random access memory (RAM) 113, removable media 114, such as a Universal Serial Bus (USB) drive, compact disk (CD) or digital versatile disk (DVD), floppy disk drive, or any other desired electronic storage medium. Instructions may also be stored in an attached (or internal) storage 115 (e.g., hard drive, flash, etc.). The computing device 110 may include one or more output devices, such as a display 116 (or an external television), and may include one or more output device controllers 117, such as a video processor. There may also be one or more user input devices 118, such as a remote control, keyboard, mouse, touch screen, microphone, etc. The computing device 110 may also include one or more network interfaces, such as input/output circuits 119 (such as a network card) to communicate with an external network 101. The network interface may be a wired interface, wireless interface, or a combination of the two. In some embodiments, the interface 119 may include a modem (e.g., a cable modem), and network 101 may include the communication lines discussed above, an in-home network, a provider's wireless, coaxial, fiber, or hybrid fiber/coaxial distribution system (e.g., a DOCSIS network), or any other desired network.

The FIG. 1b example is an example hardware configuration. Modifications may be made to add, remove, combine, divide, etc. components as desired. Additionally, the components illustrated may be implemented using basic computing devices and components, and the same components (e.g., processor 111, storage 112, user interface 116, etc.) may be used to implement any of the other computing devices and components described herein. For example, the various components herein may be implemented using computing devices having components such as a processor executing computer-executable instructions stored on a computer-readable medium, as illustrated in FIG. 1b. Some or all of the entities described herein may be software based, and may co-exist in a common physical platform (e.g., a requesting entity can be a separate software process and program from a dependent entity, both of which may be executed as software on a common computing device). Additionally, for the secure communications and processing described herein, the devices may include a security processor or security ASIC (111a—application-specific integrated circuit), which can perform the various security functions described herein as a replacement for, or augment to, any other processor 111 that the device may include. The security ASIC 111a may also include internal secure memory (not shown), which can be a secure storage for storing the various data and key values described herein. The secure memory can be any desired type of memory, and can have enhanced security features to help restrict access (e.g., can only be accessed by the security ASIC 111a, can be internal to the ASIC 111a, etc.).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2A:
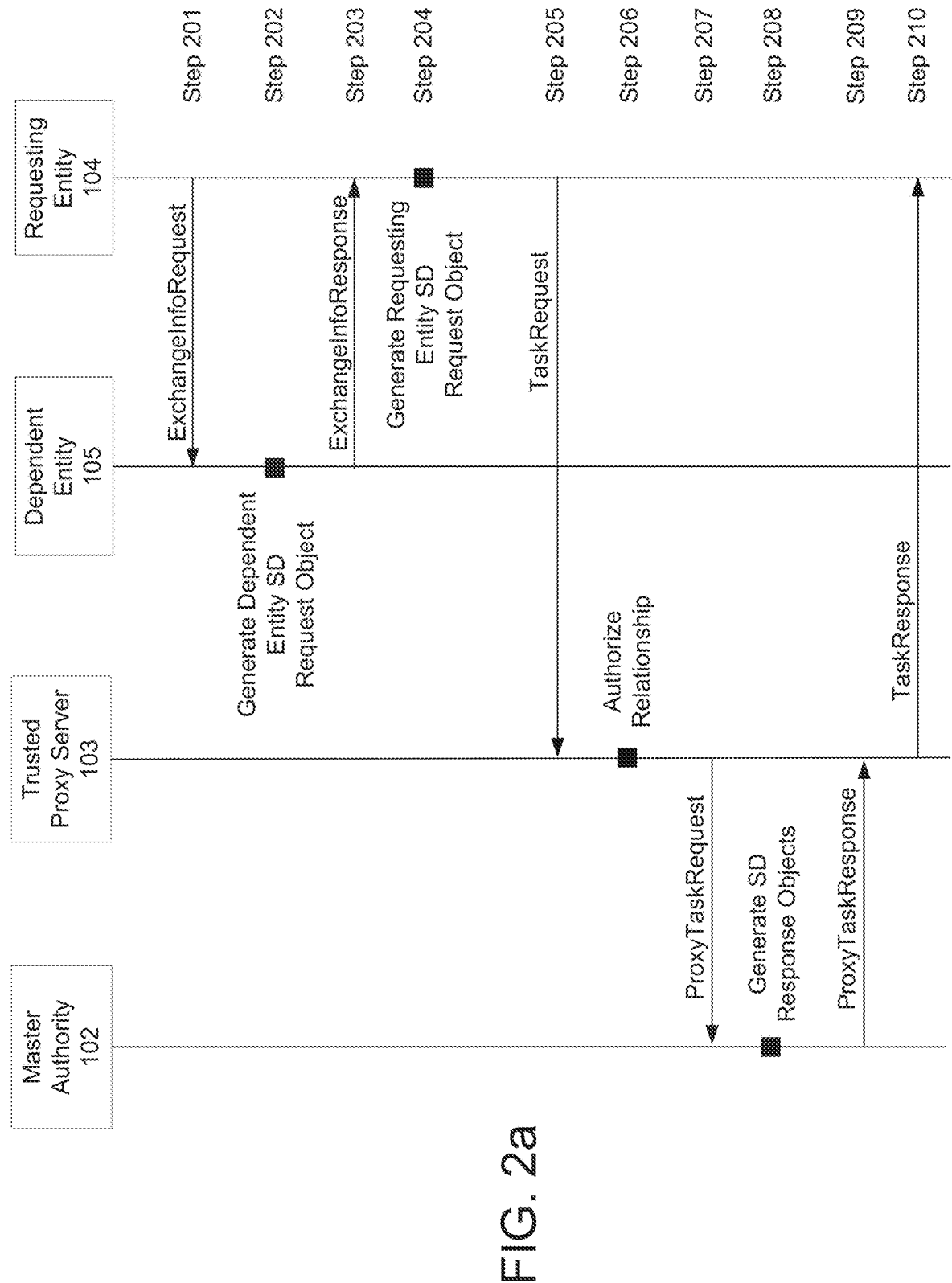
FIGS. 2a-c illustrate an example communication process for establishing keys and pairing entities.
Figure 2B:
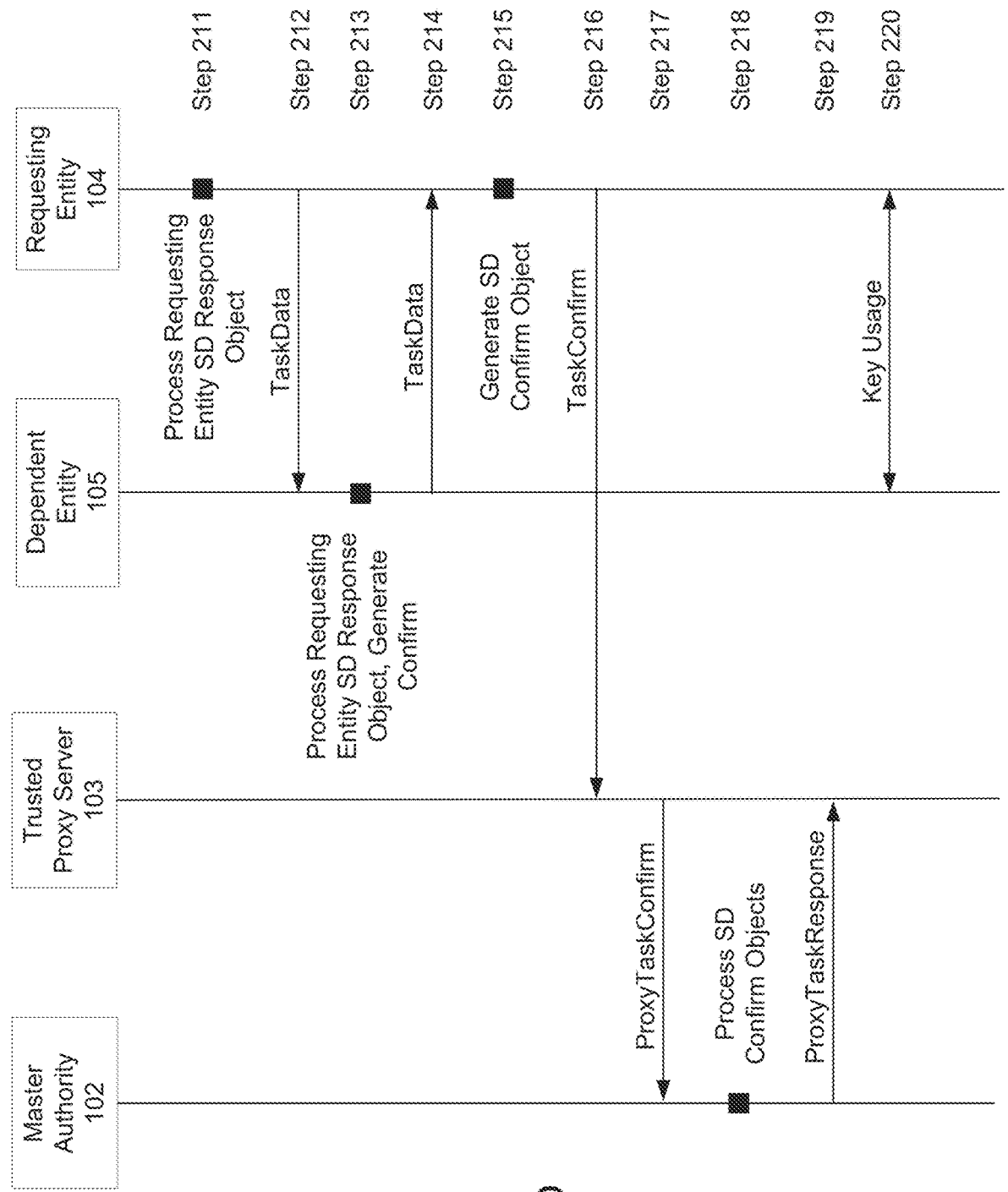

FIGS. 2a-b illustrate an example communication sequence that can be used when entities 104/105 wish to be paired with one another for communication. The pairing, and the keying infrastructure, establishes an on demand-type relationship whose trust can be re-established and confirmed in real time as the keys are needed. First, in step 201, the requesting entity 104 may transmit an ExchangeInfoRequest message to the dependent entity 105. The ExchangeInfoRequest message may be one or more packets (e.g., Internet Protocol packets) containing the identity of the requesting entity (e.g., Requesting Entity ID), and may be any desired identification value (e.g., a Media Access Control address, user name, customer identification number, etc.). This message may indicate that the identified requesting entity wishes to engage in secure communications with the dependent entity.

After the dependent entity 105 receives the ExchangeInfoRequest message and determines that it would like to engage in secure communications with the requesting entity 104, it may generate, in step 202, an object, such as a Dependent Entity Secure Data (SD) Request Object, in preparation for communicating with the requesting entity 104. This Dependent Entity SD Request Object may be a data structure that confirms to the Master Authority 102 that it (the dependent entity) would like to engage in secure communications with the requesting entity, and informs the Master Authority 102 of the most recent set of keys that have been installed in the dependent entity 105 for secure communications. The Dependent Entity SD Request Object may contain, for example, some or all of the following values:

| Field |
|---|
| Data Object Identifier |
| Requesting Entity ID |
| Dependent Entity ID |
| Request Count (n) |
| for i= 0 to n |
|     {Key Counter (i) |
|     Key Role(i) |
|     Key Usage(i)} |
| Master Authority Last Secure Data |
| Signature |

The Data Object Identifier may be a data value that identifies a particular use of the keys for the communication between the entities 104/105. For example, the keys may be intended only to be used with a predefined software application residing on the entities, such as for communicating financial transactions between a bank's server and a customer's personal computer. The identifier itself may be any data value, such as a textual word (e.g., "Bank").

The Requesting Entity ID may be any data value that identifies the requesting entity 104 (or one party to the requested pairing). As noted above, the ID can be any desired value, such as a unique address, a MAC address, a user name, a phone number, etc.

The Dependent Entity ID may be similar to the Requesting Entity ID discussed above, but identifying the dependent entity 105 instead of the requesting entity 104.

The Request Count may be a numeric value identifying the number of pairing requests being requested with the current object. The same pair of entities may use different keys for different types of communications, and may use the object to simultaneously request keys for the various types of communications. So, for example, if the pair intends to use one key for signing messages between the two, and a different one for encrypting messages between the two, the same request object can be used to request different keys for both purposes.

For each key requested, the Dependent Entity SD Request Object may include the Key Counter, Key Role and Key Usage for the requested key. The Key Counter may be used by the system (the Master Authority 102, the Requesting Entity 104 and Dependent Entity 105) to remain synchronized in terms of the authorized keys in their pairing. The Key Counter may begin at zero, and be stored in a memory at each entity. Every time a key is successfully provisioned for the pair (e.g., each time the particular entities 104/105 are provided with and successfully install a key to be used for communications between the two), the entities involved may increment their respective counter by one.

The Key Role may identify the role for the requested key. For example, the requested key could be used for encrypting outgoing communications, authenticating communications, serving as a root encryption key, root authentication key, server encryption key, server authentication key, etc.

The Key Usage may identify additional parameters for how the key is used. For example, if the prior Key Role value indicates that a key is for encrypting outgoing communications, the Key Usage value may further indicate the type of encryption, or whether the key can also be used for authentication. In some embodiments, the Key Usage information/parameters may be combined with the Key Role value, or it may be already represented by the Key Role value.

The Master Authority Last Secure Data value may contain the last known data received from the Master Authority for this particular pairing of entities. For example, the last known data from the Master Authority may have been a seed value or new key. The data may simply be a nonce or thumbprint of the actual data. Additionally, the data may be encrypted with the dependent entity's communication encryption key. Similarly, the other values (e.g., the Key Counter, Key Role and/or Key Usage values) may also be encrypted using the dependent entity's current communication encryption key. The SD Request Object may be encrypted in a manner that the Master Authority can decrypt, and which may be undecipherable to the Requesting Entity (e.g., the Requesting Entity need not possess the decryption key for decrypting the Dependent Entity's object).

When the dependent entity 105 has generated its SD Request Object, it may transmit an ExchangeInfoRequest message back to the requesting entity in step 203. This ExchangeInfoRequest message may contain the dependent entity's generated SD Request Object, and may also include the dependent entity's Dependent Entity ID (the same ID may be in the SD Request Object as well, but the Requesting Entity might not have the necessary key to decrypt that object).

In step 204, the requesting entity 104 may generate its own SD Request Object. The requesting entity's SD Request Object may be the same as the dependent entity's SD Request Object, although the requesting entity's object may use its own corresponding information. For example, it may have its own Key Counter value, its own Master Authority Last Secure Data value, its own signature, etc.

In some embodiments, the requesting entity 104 may be configured to operate in a pairing mode, and may be limited to only communicate with one dependent entity at a time. If the requesting entity 104 is in such a pairing mode, then the requesting entity may also check, in step 204, whether the requesting entity is currently already paired with another dependent entity. If it is, then the requesting entity may take steps to terminate the prior pairing before requesting a new pairing (e.g., the already-paired entity 104 may transmit a request to its prior paired entity, informing it that the pairing is about to be torn down). If it is not, then the requesting entity 104 may delete data (e.g., a prior SD Request Object) it had that was previously stored for the prior dependent entity, which may have been stored pending approval of a requested pairing, and can store the current dependent entity's request object (and to eventually compare it with information received from the Master Authority when the pairing is approved). Alternatively, if the requesting entity is already paired, it can simply reject the new pairing request. This may occur, for example, if the prior pairing is given a higher priority than the current requested one, or if the current pairing is in active use. You could just have factory pairing; or it could be up to the trusted proxy or master authority.

In step 205, the requesting entity 104 may transmit a TaskRequest message to a Trusted ProxyTrusted Proxy 103, to request authorization for a relationship between the requesting entity and the dependent entity. The TaskRequest message may contain the Requesting and Dependent Entity SD Request Objects discussed above. In some embodiments, this pairing request can be performed every time the requesting entity and dependent entity wish to transmit secure communications with one another.

Figure 5:
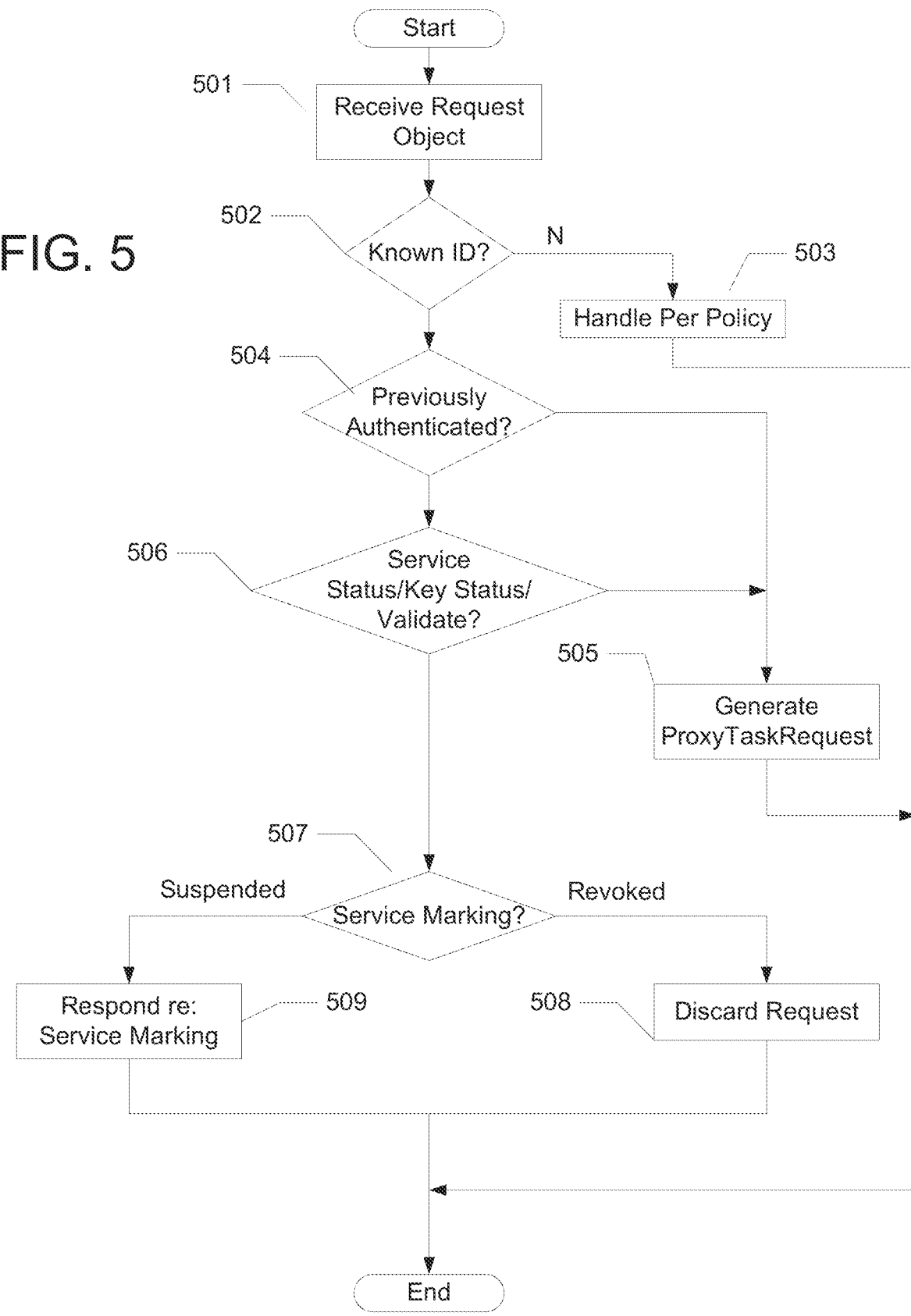
FIG. 5 illustrates an example process for authenticating a pairing request.

In step 206, the Trusted ProxyTrusted Proxy 103 may conduct a policy authorization check to determine if the two identified entities are permitted to have the requested relationship. This check may involve, for example, consulting a database that identifies permitted key uses for each unique Entity ID value. FIG. 5 illustrates an example process that the Trusted ProxyTrusted Proxy 103 may undergo when handling the TaskRequest message.

When the relationship is authorized, the Trusted ProxyTrusted Proxy 103 may send, in step 207, a ProxyTaskRequest message to the master authority 102. The ProxyTaskRequest message may contain both of the Entity SD Request Objects discussed above, and may indicate to the master authority 102 that the requested relationship has been approved by the Trusted ProxyTrusted Proxy 103.

In step 208, the master authority 102 may generate SD Response Objects for both the requesting entity 104 and the dependent entity 105. The SD Response Objects may provide keying and security information for the authorized relationship. An example of a Requesting Entity SD Response Object may contain some or all of the following values:

| Field | Value |
|---|---|
| Data Object Identifier | |
| Requesting Entity ID | |
| Dependent Entity ID | |
| Requesting Entity Encryption Key Identifier | |
| Key Count (n) | |
| for i= 0 to n | |
|     {Key Counter (i) | |
|     Key(i) | |
|     Key Role(i) | |
|     Key Usage(i) | |
|     Key Status(i) | |
|     Challenge (i)} | |
| Signature | |

The Data Object Identifier, Requesting Entity ID and Dependent Entity ID values are discussed above. The Requesting Entity Encryption Key Identifier may be a unique identifier of the current encryption key being used by the requesting entity 104. The Master Authority 102 may be aware of this by virtue of having provided that key to the requesting entity either during its initial manufacture, or during an earlier provisioning process. The identifier itself can be a simple number (e.g., "1"), or data string (e.g., "Key A"), or other value to identify which of its previously-stored keys is in use.

The Key Count is a numeric value identifying the number of keys that are being supplied in the Requesting Entity SD Response Object. As noted above, the original request objects included a Request Count value identifying the number of keys that the requesting pair of entities needed, and the response object Key Count informs the requesting entity how many of these keys are being supplied.

For each key in the Key Count, the Requesting Entity SD Response Object may include the Key Counter, Key, Key Role, Key Usage, Key Status and Challenge illustrated in the above table. In some embodiments, all of these values may be encrypted using the requesting entity's current encryption key (as identified by the Requesting Entity Encryption Key Identifier).

As discussed above, the various entities may each store a copy of a Key Counter, counting the number of times a new key is provisioned for an identified pair, and included an incremental counter for the number of new keys being requested. The response to this request may re-use the Key Counters, correlating them to the keys being supplied. So, for example, if the request was for keys 10, 11 and 12, the response to the request may provide 3 keys correlated to count numbers 10, 11 and 12.

The Key may, as its name implies, be a key supplied by the master authority in response to the request, for the particular Key Counter and Key Role/Usage identified in the request. This value may be a cleartext, actual key value, or it may be a seed value to be used with a derivation function to arrive at the value that will be used for an actual key. The derivation function may be any desired encryption algorithm that is understood by both the master authority 102 and the requesting entity 104. In some embodiments, the Key value may actually already be stored at the requesting entity, and the Key value can simply be a key identifier, informing the requesting entity which of its secret keys (stored in the secure memory area mentioned above) should be used as a key for this particular relationship key.

The Key Role value may identify how the corresponding Key is permitted to be used, and may match the role requested by the requesting entity's object. For example, the key may be restricted to use as a communication encryption key (to encrypt outgoing communications to the dependent entity 105), a communication authentication key (to decrypt incoming communications from the dependent entity 105), a root encryption key (to sign messages for the dependent entity 105), root authentication key (to authenticate signatures from the dependent entity 105), server encryption key (to encrypt communications going to the Trusted ProxyTrusted Proxy 103), server authentication key (to decrypt communications coming from the Trusted ProxyTrusted Proxy 103), etc. The Key Role value can simply identify one or more of these uses.

The Key Usage value may further identify usage parameters given the Key Role identified above, if the identified Key Role includes a plurality of possible usages. This may correspond to the additional parameters (if any) provided in the request object, discussed above. If the Key Role has no such additional usages, the Key Usage value may simply be omitted.

The Key Status value may set a status for an identified key. For example, if a key needs to be temporarily revoked, the Key Status value may indicate that the identified key is temporarily inactive, but that it should be retained by the entity for a future activation. Similarly, a Key Status value in a future message may reactivate the key. Example status values can vary depending on whatever business implementation is using the keys, and possible values can include unknown keys, pre-authorized keys, suspended keys, suspect keys, retired keys and killed keys.

The Challenge value may simply be a random (or pseudo-random) number generated by the master authority 102, and encrypted by the requesting entity's current key (as identified by the Encryption Key ID). Upon receiving this challenge value, the requesting entity can decrypt it, and then use it in a future nonce challenge when communicating with the Master Authority 102. For example, the Master Authority Last Secure Data from the request object discussed above can be (or encrypt) the most recent (e.g., highest Key Counter) Challenge value received in a prior response from the Master Authority.

The Signature value may be a signature of the entire SD Response Object using the master authority message signing key. This signature may be made using any desired approach, such as a Hash-based Message Authentication Code (HMAC).

The description above describes an example SD Response Object for the requesting entity, but a similar object may be generated for the dependent entity as well (but with values for the dependent entity instead of the requesting entity, for example).

After the SD Response Objects have been generated, they may be transmitted to the Trusted Proxy 103 in step 209, using a ProxyTaskResponse message. The Trusted Proxy 103 may then update its own internal databases and/or memories with the keying information in the SD Response Objects.

The Trusted Proxy 103 may then transmit, in step 210, a TaskResponse message to the requesting entity. The TaskResponse message may contain the Requesting Entity and Dependent Entity SD Response Objects.

In step 211, the requesting entity 104 may process the Requesting Entity SD Response Object, and install the data contained therein. This may involve, for example, storing the object and its keys in a secure memory, and updating its own Key Counter to correspond with the Key Counter in the object.

In step 212, the requesting entity 104 may transmit a TaskData message to the dependent entity 103. The TaskData message may contain the Dependent Entity SD Response Object.

In step 213, the dependent entity 103 may process and install its SD Response Object in a similar manner as the requesting entity 104. The dependent entity 103 may also generate a Dependent Entity SD Confirm Object. The SD Confirm Object may confirm that the last keys or secure data provided from the master authority was successfully processed and installed based on a signature over the last challenge sent in the last key provisioning between those entities from the master authority. The actual Dependent Entity SD Confirm Object may simply be a signed version of the Challenge value that was included in the Dependent Entity SD Response Object, without including a copy of that Challenge value itself. The signed version can be generated using any desired signature algorithm, such as an HMAC algorithm. Additional padding may also be added using the dependent entity's own message signing key.

In various embodiments herein, an object (e.g., a secure data response object) having a field (e.g., an entity identifier) may leave such a field blank, in which case a message or packet carrying the object may be assumed to have the missing identity information. For example, upon receipt of an object having a blank identifier, the recipient can be configured to consult the message that carried the object to find the missing entity identification information.

In step 214, the dependent entity 105 may transmit a TaskDataResponse message to the requesting entity 104. The TaskDataResponse message may contain the Dependent Entity SD Confirm Object, and may inform the requesting entity 104 that the new dependent entity key data was successfully processed and installed.

In step 215, the requesting entity 105 may generate its own SD Confirm Object, similar to that of the dependent entity 104, to confirm that the requesting entity also successfully processed and installed the keys from its SD Response Object. Then, in step 216, the requesting entity may transmit a TaskConfirm message to the Trusted ProxyTrusted Proxy 103. The TaskConfirm message may contain both of the SD Confirm Objects generated by the requesting and dependent entities, which may inform the Trusted ProxyTrusted Proxy 103 that both entities have successfully processed and installed the key information from the master authority. The Trusted ProxyTrusted Proxy 103 may then check to determine whether the requesting entity is authorized to transact on the domain managed by the Trusted Proxy 103. For example, the Trusted Proxy 103 may manage access to a particular Internet service, and can maintain a register of authorized users. If the requesting entity's ID is on the authorized register, then the confirm message can be forwarded as discussed below. If it is not, then the proxy 103 can return an error code to the requesting entity, informing it that the request has been denied due to lack of authorization from the proxy 103.

In step 217, the Trusted Proxy 103 may transmit a ProxyTaskConfirm message to the master authority. The ProxyTaskConfirm message may contain both of the SD Confirm Objects from the requesting and dependent entities. Sending these objects confirms to the master authority that the keying information was successfully delivered to the entities.

In step 218, the master authority 102 may process the SD Confirm Objects, to note that the keying information has been successfully installed to the entities. In step 219, the master authority 102 may send a ProxyTaskConfirmAck message to the Trusted Proxy 103, to inform the server that the ProxyTaskConfirm message was received. The form of this acknowledgement may be a signed version of one or both of the SD Confirm Objects.

In step 220, the two entities may proceed to use their respective keys for the approved purposes. These purposes can include any desired use of keys for security, such as encryption, secure communication, signing of messages, etc. In some embodiments, the pairing discussed above can be performed every time a requesting and/or dependent entity wish to communicate with one another, or wish to use a key for any desired purpose. This constant communication and confirmation allows the pair to be synchronized with the master authority, helping to ensure that security remains up to date.

Figure 2C:
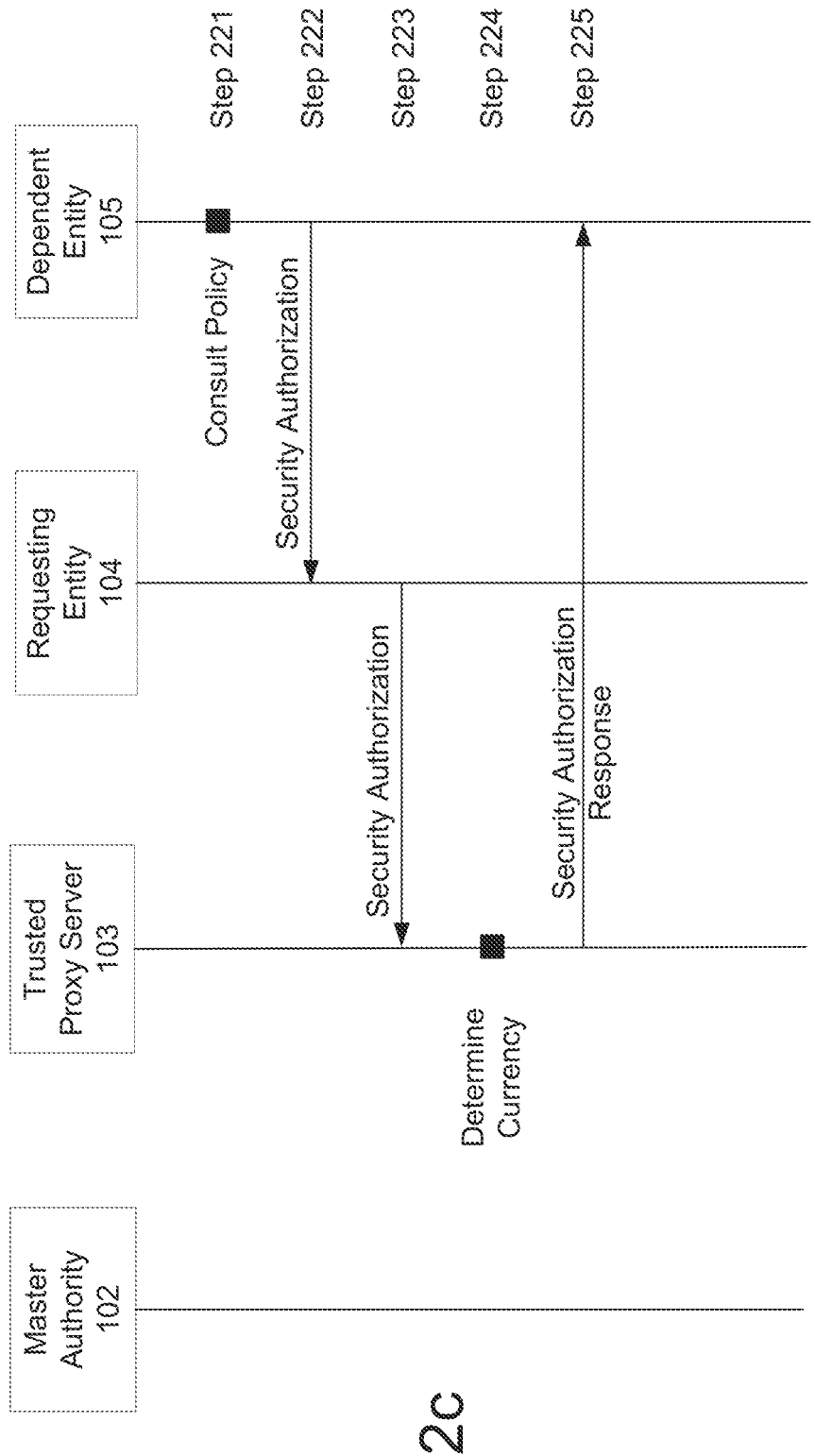

FIG. 2c illustrates an example sequence of steps for key usage when, for example, a dependent entity 105 wishes to take an action that will use a key. Any desired action can require a key. For example, normal communications, device startup or reset communications, network registration, and software downloads are several examples of the kind of activity that may require a key.

In some embodiments, the dependent entity may consult its policy database for every desired communication with an external entity. In step 221, the dependent entity 105 may first consult stored policy information to determine if its desired action (e.g., sending a message to a requesting entity) has a corresponding key and secure usage. The policy information may be a stored database containing the keying information that the dependent entity 105 received in an SD Response Object in step 208. This database, which can be stored in any desired memory (e.g., RAM 113 of the entity) may identify parties who have authorized relationships with the dependent entity, a plurality of Key Roles and Key Usages for communications with that party, along with the Key value (or values) itself. The policy database may indicate, for example, that messages sent from the dependent entity 105 to an identified requesting entity 104 may require use of a specific key and algorithm for signing outgoing messages, a different key and algorithm for encrypting content in those message, and yet another key for decrypting messages received from that requesting entity 104.

In one aspect, if the policy does not indicate a key is required for the desired action with the desired requesting entity, then the dependent entity 105 can simply proceed with its action (e.g., sending a message). However, if the policy indicated that a key was required, then the dependent entity 105 may first take steps to determine whether its current key for that purpose is still valid.

Since the dependent entity 105 in this example relies on a requesting entity 104 for network communications, the dependent entity 105 may first, in step 222, transmit a security authorization message to the requesting entity 104, requesting that the entity 104 pass the message on up to the master authority 102 and/or its proxy 103. The security authorization message may contain identifications of both the dependent entity 105 and the requesting entity 104, the desired action (e.g., sending message), and keying information indicating the key that the dependent entity believes is the current one for the desired action. This message is part of the dependent entity's 105 attempt to verify the key ownership, validity and key usage permissions prior to using the key that it has. For example, if the dependent entity needs to sign a secure message to the requesting entity, then this message may contain a copy of the key that the dependent entity's policy database indicates is the key to use for signing the message. This indication can be the key itself, or simply a counter value, hash, or other anonymized way of identifying the key. The security authorization message itself may be encrypted by the dependent entity 105 using, for example, a key and algorithm known to the master authority 102 or proxy 103.

The requesting entity 104 may, in turn, transmit the message to the proxy 103 in step 223. In doing so, the requesting entity 104 may package and/or further encrypt the message to ensure secure delivery to the proxy 103.

In step 224, the proxy 103 may determine whether the dependent entity's key is up to date for the desired transaction. The proxy 103 may maintain its own database of security policy for the various pairings and transactions that have been approved by the master authority 102, and may consult the database to determine if the dependent entity's keying information is current. The proxy 103 may also consult the master authority 102 for this purpose as well, if desired. If it is current, then the proxy 103 may transmit a response in step 225, indicating that the keys are current. The response may be sent to the requesting entity 104, which may pass it on to the dependent entity 105, and the message may be encrypted for this transmission by the proxy 103 and the requesting entity 104 if desired.

In some embodiments, the entity and master authority 102 may employ a split key. In a split key, the key is divided into two portions, and the master authority 102 (or proxy 103) stores one portion and the entity stores the other. In such a configuration, the entity may be configured to request validation of its own key for every desired keying action, and also request the other part (or half) of the key.

If the dependent entity's information is not current, then the response message may be a denial, and may trigger a key renewal process by, for example, transmitting a key renewal request to the master authority 102. An example key renewal is discussed below.

Figure 3:
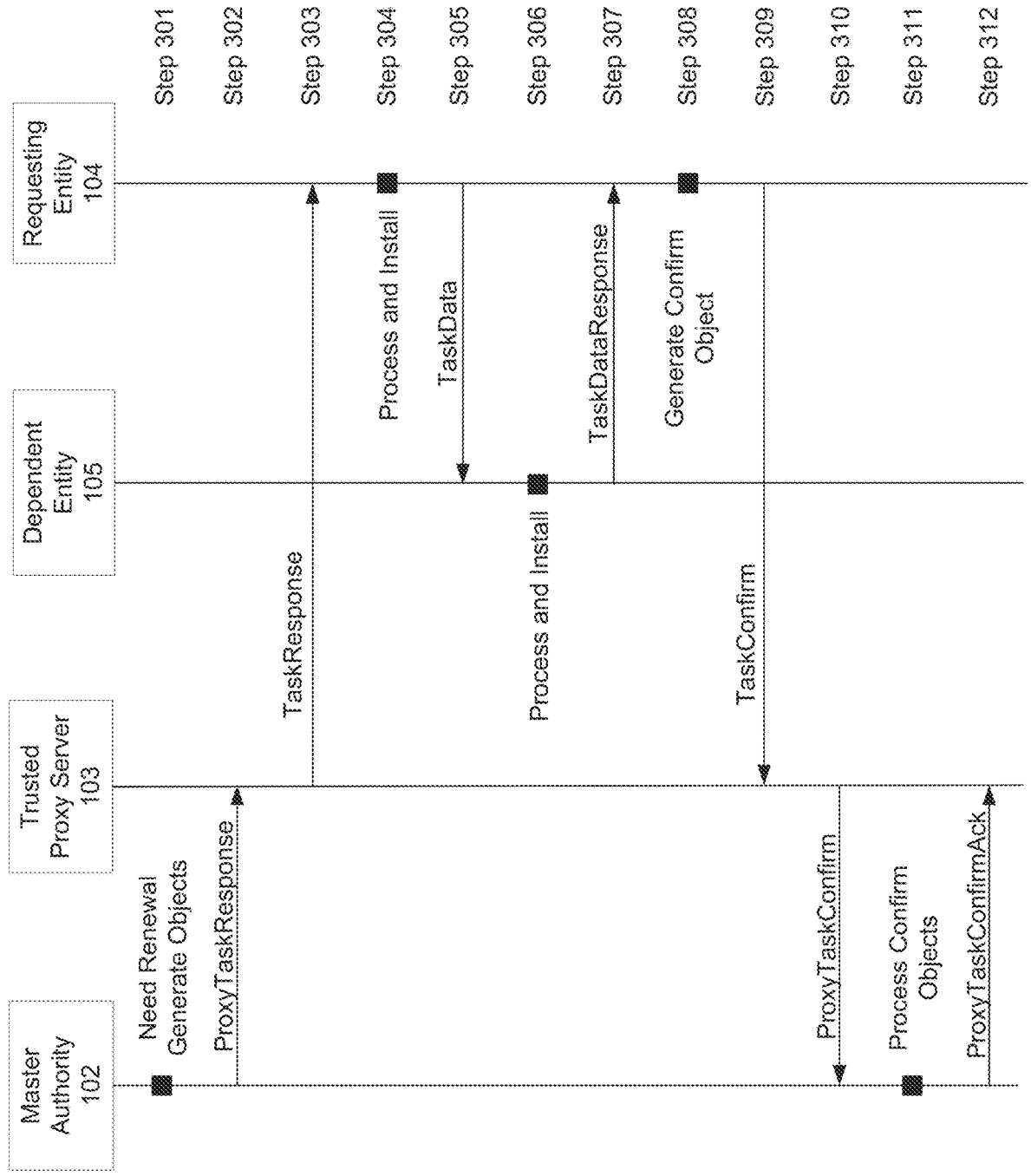
FIG. 3 illustrates an example communication process for renewing keys.

FIG. 3 illustrates an example communication sequence when one or more keys need to be renewed. Any entity in the system may request renewal of its keys, based on any desired criteria. For example, the Master Authority 102 may limit some keys to a predetermined time limit (e.g., 5 minutes, 7 days, etc.), and at end of that time limit, the entity using those keys (or the Master Authority 102), may determine that the limit has been reached, and request a new key or keys. In some embodiments, the Master Authority 102 may monitor lifetimes of the various keys it has issued, and may transmit group beacon messages to the various entities, informing them that keys need to be renewed.

In step 301, the Master Authority 102 may determine that keys for the authorized pair of Requesting/Dependent entities 104/105 need to be renewed. The Master Authority 102 can generate data objects that will be used to carry the new keys to be used by the pair. Those data objects may follow the format of the Requesting Entity SD Response Object discussed above, and different objects may be generated for the requesting and dependent entities 104/105.

In step 302, the Master Authority 102 may transmit a ProxyTaskResponse message, containing the Requesting Entity SD Response Object and Dependent Entity SD Response Object, to the Trusted Proxy 103. The Trusted Proxy 103 may update its own database to store copies of these objects, so that the Trusted Proxy 103 stores a copy of the new keys that are going to be used by the entities 104/105. In the case of a key renewal, the response objects may contain an entirely new set of keys and key role/usage/status information.

Then, in step 303, the Trusted Proxy 103 may transmit a TaskResponse message, containing both the Requesting Entity SD Response Object and the Dependent Entity SD Response Object, to the Requesting Entity 104. The Requesting Entity 104 may process the Requesting Entity SD Response Object to extract the key structure information contained therein, and store it in its own memory for use in future secure communications, in step 304. The messages sent in steps 302 and 303 can be transmitted to a multitude of entities, acting as a beacon to alert the entities that keys are changing. In some embodiments, the messages can be multicast messages addressed to groups of entities who have registered as a group and/or have been assigned keys as a group.

In step 305, the Requesting Entity 104 may then transmit a TaskData message, containing the Dependent Entity SD Response Object, to the Dependent Entity 105. In step 306, the Dependent Entity 105 may process the TaskData message, extract the Dependent Entity SD Response Object, and install it (e.g., the key structure contained therein) in its own memory for use in future secure communications. The Dependent Entity may also generate a Dependent Entity Secure Data Confirm Object. Such an object may ultimately inform the Master Authority 102 (or any other receiving entity) that the key installation was successful. The object may include a signed version of the current challenge, as presented in the Dependent Entity SD Response Object. For example, if this is the $3^{rd}$ time that the entities 104/105 have been provisioned as a pair for communications, then the index pointer "i" may be a value of "2", and the "Challenge (2)" value can be signed by the Dependent Entity using its message signing key (which can be, for example, one of the designated Key Roles supplied in the structure, such as the key "Message Signing (2)"). This signature can be made using any desired signing algorithm, such as HMAC (Hash-based Message Authentication Code).

In step 307, the Dependent Entity 105 may generate a TaskDataResponse message, containing its Secure Data Confirm Object, and transmit it to the Requesting Entity 104.

In step 308, the Requesting Entity 104 may generate its own Secure Data Confirm Object, similar to the one generated by the Dependent Entity described above (although using a signing key and challenge from the Requesting Entity's object, instead of the Dependent Entity's object). In step 309, the Requesting Entity 104 may transmit a Task-Confirm message, containing both confirm objects from the Requesting and Dependent entities, to the Trusted Proxy 103.

In step 310, the Trusted Proxy 103 may encapsulate the confirm objects into a ProxyTaskConfirm message, and send it to the Master Authority 102. The Master Authority 102 may process the confirm objects to determine that both sets of new keys were successfully installed for the pair in step 311, and may store information identifying the authorized pair, their keys and/or their objects in a secure database. Then, in step 312, the Master Authority 102 may send an acknowledgement ProxyTaskConfirmAck message to the Trusted Proxy 103.

Once the key renewal has been confirmed to the Trusted Proxy 103, then the pair can begin to use their new keys for secure communications.

The example renewal process discussed above is a one-stage renewal, where the master authority 102 or proxy 103 handles generation of new keys. The new set of keying information can be generated or obtained by the master authority 102 (or the proxy 103, if the proxy 103 is managing the keys in question), and that information is provided to the entity for installation and future use. In alternative embodiments, the renewal can be a two-stage process, in which the master authority 102 or proxy 103 do not generate new keys, but rather allow the keyed entity to do so. In a two-stage process, the master authority 102 or proxy 103 may provide (e.g., in an SD response message) an indication that keys should be renewed, and may also provide a seed value for generation of one or more new keys, but without providing the new key(s). Instead, the entity whose keys are being renewed may use the seed value (or generate one), along with one or more desired derivation functions, to generate a new key structure. The entity-generated key information can then be supplied back to the master authority 102, which may then update its own records to indicate the new keys. The master authority 102 may also know the derivation function, and may be supplied with whatever seed value the entity used, and the master authority may validate the new key(s) by conducting the same derivation function on the seed and compare the results with what the entity provided.

Figure 4:
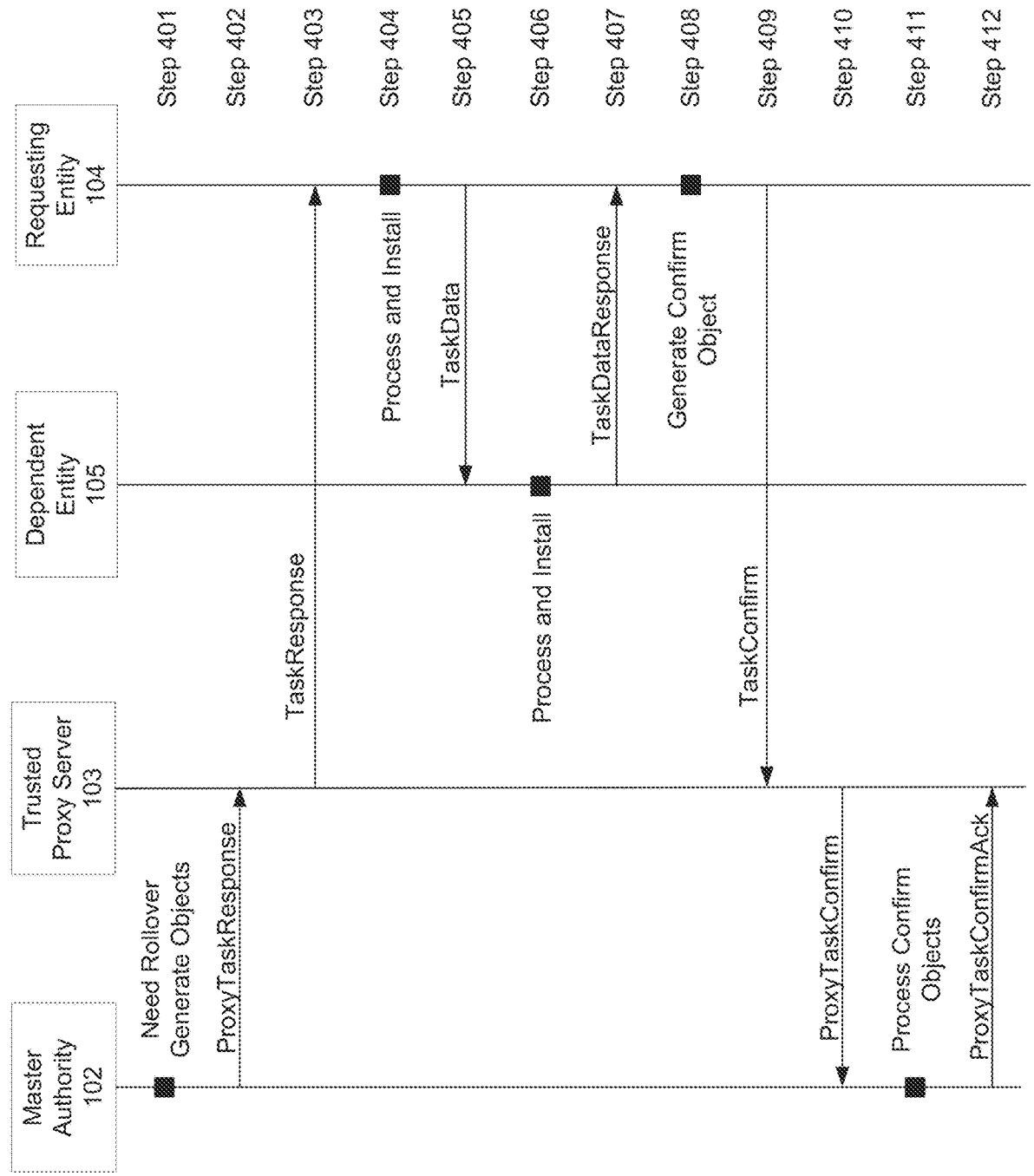
FIG. 4 illustrates an example communication process for key rollover.

FIG. 4 illustrates an example signaling flow for a key rollover process. The signaling flow for a key rollover may be the same as that for a key renewal illustrated in FIG. 3, and many of the same steps correspond between the two flows (numbered with 400-series numbers instead of 300-series ones). One notable difference is found in the payloads in the initial messaging. In the FIG. 3 key renewal process, the example proxy task response message sent in step 302 may have contained a new set of keys and key role/usage/status information, and the new set of keys and associated information may have replaced a previously existing set stored at the dependent entity 105. In the case of a key rollover, the existing set may still be used. Rather than providing a new key data structure in the response object, the response object for a key rollover may simply identify the key and/or usage, from an existing set that the entity already has, that is to be rolled to another key or usage. For example, if the dependent entity 105's existing key information included a key structure with 10 keys, and was currently using the $5^{th}$ key for encrypting message to a particular recipient, the response message 402 may simply identify that key (e.g., indicating a key counter of '5' for the given pairing/usage), and the dependent entity 105 may react by using the next key instead (i.e., the $6^{th}$ key).

Key rollover can also alter the key usages. For example, a given key may be initially used solely for one purpose (e.g., encrypting a message for delivery), and it can be rolled to another purpose (e.g., now serving as a signing key, with a different key to be used for encrypting messages).

In some embodiments, the data object for a rollover may include a challenge value that is encrypted with the requesting entity's own encryption key.

In the FIG. 2a example above, at step 206, the Trusted Proxy 103 was described as authorizing a requested relationship. The example proceeds with approval in step 207, but other results may occur as well. FIG. 5 illustrates an example of this authorization process.

In step 501, the request object may be received (similar to step 205 above). In step 502, the Trusted Proxy 103 may determine whether the pair of entities identified in the request (e.g., the Requesting and Dependent Identifiers) is known to the server 103. A pair may be known to the server, for example, by receiving a listing of authenticated entity identification values from the Master Authority 102. To elaborate, during manufacture of the entity devices, the devices may undergo a keying and authentication process, in which one or more keys and associated software may be stored into a memory. The Master Authority 102, or another entity, may store a database of the unique identifiers (e.g., MAC addresses) for these entity devices, and some or all of this database may be used by the Trusted Proxy 103. If the entity identifiers in the request objects are listed in the database, then the entities are considered known.

If either of the entities is unknown, the server may proceed to step 503, and handle the request according to any desired policy. For example, the server may respond to both entities, informing them that their request is denied, and informing them of the reason why (e.g., unidentified entity). If only one of the entities was known, the server could simply respond to the known one, informing it that the other entity was not known.

If both entities are known, then the server may proceed to step 504, and determine whether this particular pairing of entities has been authenticated before. The server may do this, for example, by consulting a stored database identifying the entity pairs that have been authorized and provided with keys using, for example, the FIGS. 2a-b process. If the pair has not been previously authorized, then the server may proceed to step 505, and transmit the ProxyTaskRequest message on to the Master Authority 102 (similar to step 207).

If the pair had been previously authorized, then the server may proceed to step 506, and consult its own internal database to determine whether the pair remains allowed to communicate. For example, some pairings may have a limited time duration (e.g., two entities may only communicate for 7 days). This check may involve checking the service status, key status, or otherwise validating the request. For example, a service status may indicate whether a particular service is functional and available, such as a video on demand service being able to service a video request.

If the requested communication is permitted in view of the key status/server status/validation, then the server may proceed to step 505, and issue the ProxyTaskRequest message to the Master Authority 102.

However, if the service is not permitted, then the server may proceed to step 507, and determine whether the service marking is suspended or revoked. In other embodiments, other actions can be take as well (e.g., sending messages to inform the requesting and dependent entities of the refusal, offering options for re-authorizing service, etc.).

If the service marking for the pair has been revoked, then the server may proceed to step 508, and simply discard the request. In some embodiments, no response is provided to the requesting entities (the lack of responsive feedback can help deter or obstruct hackers), and in others, a response may be provided to inform the entities that the requested pairing has been denied.

If the service marking for the pair is merely suspended, then the server may proceed to step 509, and take steps to begin the process of removing the suspension. For example, the step 509 may involve sending a response to one or both entities, informing them that their service has been suspended, and offering them information as to how to remove the suspension (e.g., pay an outstanding bill, contact customer service, etc.).

Figure 6:
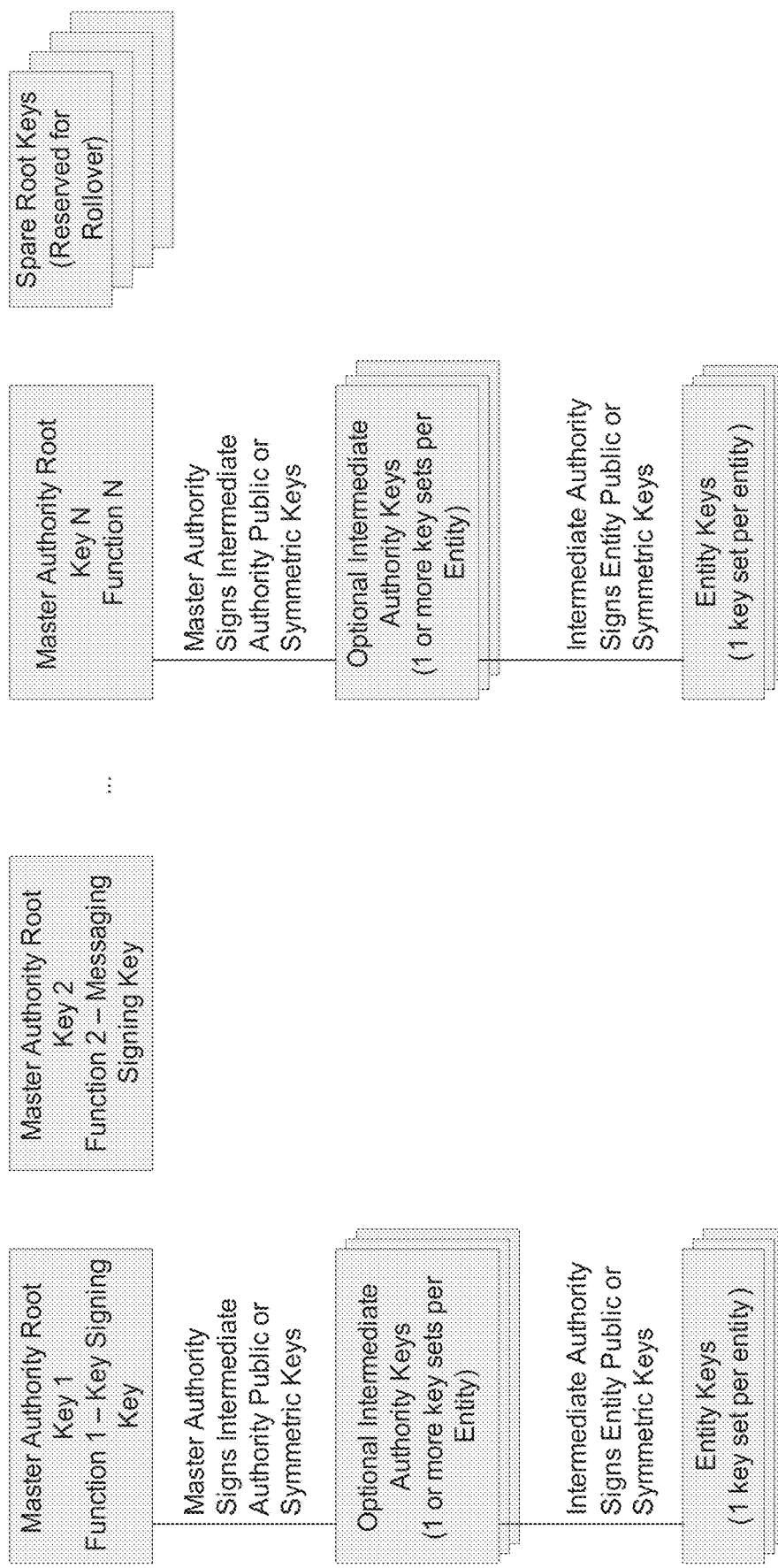
FIG. 6 illustrates an example key hierarchy.

In the example discussions above, various keys may be assigned to various entities, and for various purposes. This may result in having a key hierarchy, such as the one shown in FIG. 6. In the FIG. 6 example, the Master Authority 102 may store a first root key whose function is for signing other keys dispensed by the master authority 102. For example, the key structure (or components therein) in the SD response object discussed above may be signed by the master authority's key signing key. The master authority 102's key hierarchy may include one or more additional, lower-level keys, which may be used for specific purposes, such as signing keys for predetermined entities.

The master authority 102 may also have a second key, to be used for signing messages that it sends. Its hierarchy can also, if desired (but not depicted) include one or more lower-level message signing keys that can be used in certain predetermined instances, such as signing messages for predetermined recipients. Indeed, the master authority's key hierarchy can have any number of function-specific keys, and each may have any number of lower-level keys that can be used for the same function but in different predefined situations. The master authority 102 may also have one or more spare keys, which can be used in the event of a future rollover.

Additionally, the keys in the hierarchies can undergo one or more derivation functions before actual usage. For example, if the master authority has a message signing root key, that key can be directly used to sign messages (using any desired signing algorithm), or the key can be subjected to a derivation function before using it to sign the messages. By requiring a derivation function before use, the security of the system can be further enhanced.

Security can further be enhanced through the use of intermediaries, such as proxies 103. Proxies 103 can use their own keys for signing entity keys, which reduces the usage of the master authority 102's own root keys.

There is no requirement for a specific key hierarchy structure with a reoccurring keying system as described herein, and the system provides the flexibility to accommodate various structures. The key hierarchy can be built to solve the industry or company issues and to best security practices. The Master Authority may oversee all keying functions of the network to ensure security is always valid.

Multi-level key hierarchies or assigned key roles can be used, and the Reoccurring Keying System supports both equally well. Within a multi-level key hierarchy, the Master Authority may hold multiple Root Keys that are separately assigned to sign registered keys and sign messages to the entities. The number and structure of hierarchies can be unique for each system design.

The keying system may include key derivation functions that can be used on some predetermined basis or signaled for usage, and any desired derivation function can be used.

The various keys in the hierarchy may be generated at different times, by different entities, and for different purposes. The following table shows example lifecycles for various keys that can be used in the current system.

| | Key | | | | |
|---|---|---|---|---|---|
| Key Management Lifecycle | Master Authority Root Key 1 | Master Authority Root Key 2 | Intermediate Authority Key | Entity Encryption Key | Entity Signing Key |
| Generated By | Master Authority | Master Authority | Master or Intermediate Authority | Master, Intermediate Authority or Entity | Master or Intermediate Authority or Entity |
| Owned and Secured By | Master Authority | Master Authority | Intermediate Authority | Intermediate Authority or Entity | Intermediate Authority or Entity |
| Registered With | Master Authority | Master Authority | Master Authority | Master Authority | Master Authority |
| Usage | Master Authority uses to Sign Intermediate or Entity Keys | Master Authority uses to Sign Messages to Entities | Intermediate Authority uses to Sign Entity Keys | Entity uses to encrypt messages or data | Entity uses to sign messages or data |
| Revocation Status | Master Authority | Master Authority | Master Authority | Master Authority | Master Authority |
| Renewal/ Rollover Status | Master Authority | Master Authority | Intermediate Authority Requests Renewal | Intermediate Authority Requests Renewal | Intermediate Authority Requests Renewal |

Entities may request permission from the Master Authority for any 1st key usage, and to re-request permission for every communication or secure action, and also upon a request for a change in policy, entity communication, service change request, designated security policy rules or for other reasons as the designers of the system specify.

The examples above include a Trusted Proxy 103. In some embodiments, multiple such servers can be used, and in some embodiments, the Trusted Proxy 103 may be omitted (allowing the entities to directly communicate with the Master Authority 102).

The examples above describe pairing of two entities. In alternate embodiments, more than 2 entities can be involved in an approved communication. For example, three or more different entities can share their respective object information with one another, and the TaskRequest message may request approval for the entire group to be authorized for communications with each other. In such embodiments, different keys may be provided for communications between specific pairs within the group, or some keys may be provided to allow any device in the group to communicate with any other device in the group.

The discussion herein uses various names for messages (e.g., "ExchangeInfoRequest," "TaskRequest," etc.) as a convenience for discussion purposes. These names are merely examples used for identifying the messages in the discussion, and do not necessarily limit or define requirements of the messages described. Other messages having similar functionality described may also be used.

Although example embodiments are described above, the various features and steps may be combined, divided, omitted, and/or augmented in any desired manner, depending on the specific secure process desired. This patent should not be limited to the example embodiments described, but rather should have its scope determined by the claims that follow:

The invention claimed is:

1. A first computing device comprising:
one or more processors; and
memory storing instructions that, when executed by the one or more processors, cause the first computing device to:
send, to a second computing device, a first request to establish a secure communication between the first computing device and the second computing device;
receive, from the second computing device, a response to the first request;
send, to a trusted computing device and based on the response to the first request, a second request to establish the secure communication between the first computing device and the second computing device;
receive, from the trusted computing device:
an indication of a plurality of keys; and
an indication of a type of key usage for each of the plurality of keys, wherein each of the plurality of keys has a different type of key usage;
process, a first key of the plurality of keys and a type of key usage for the first key, to establish the secure communication between the first computing device and the second computing device; and
send, to the trusted computing device, verification of an establishment of the secure communication based on the first key and the type of key usage of the first key.

2. The first computing device of claim 1, wherein the first key is usage-specific and device pair-specific.

3. The first computing device of claim 1, wherein the instructions, when executed by the one or more processors, cause the first computing device to:
send to the trusted computing device a request for verification that the first key is valid; and
process, the first key of the plurality of keys and the type of key usage for the first key, to establish the secure communication in response to receiving a confirmation that the first key is valid.

4. The first computing device of claim 3, wherein the request for verification comprises an indication of the first computing device, the second computing device, and the type of key usage of the first key.

5. The first computing device of claim 3, wherein the request for verification comprises an indication of a last known datum:
received by the first computing device;
from the trusted computing device; and
for a pairing of the first computing device and the second computing device.

6. The first computing device of claim 1, wherein the instructions, when executed by the one or more processors, cause the first computing device to:
process an instruction received from the trusted computing device to change the type of key usage of the first key.

7. The first computing device of claim 1, wherein the instructions, when executed by the one or more processors, cause the first computing device to:
when the first key is no longer valid, process a received indication of a replacement key to establish a second secure communication between the first computing device and the second computing device.

8. A trusted computing device comprising:
one or more processors; and
memory storing instructions that, when executed by the one or more processors, cause the trusted computing device to:
process a received first request to establish a secure communication between a first computing device and a second computing device;
send to the first computing device:
an indication of a plurality of keys; and
an indication of a type of key usage for each of the plurality of keys, wherein each of the plurality of keys has a different type of key usage; and
process a verification, received from the first computing device, of an establishment of the secure communication between the first computing device and the second computing device based on a first key of the plurality of keys and a type of key usage of the first key.

9. The trusted computing device of claim 8, wherein the first key of the plurality of keys is assigned to a group of three or more devices for one or more secure communications, wherein the first computing device and the second computing device are in the group.

10. The trusted computing device of claim 8, wherein the instructions, when executed by the one or more processors, cause the trusted computing device to:
send, to the first computing device, an instruction to change the type of key usage of the first key.

11. The trusted computing device of claim 8, wherein the instructions, when executed by the one or more processors, cause the trusted computing device to send, to the first computing device, the indication of the plurality of keys and the indication of the type of key usage for each of the plurality of keys, in response to receiving, from the first computing device, a request to verify that one or more of the plurality of keys is valid.

12. The trusted computing device of claim 8, wherein the instructions, when executed by the one or more processors, cause the trusted computing device to:
process a request, received from the first computing device, to verify that the first key of the plurality of keys is valid.

13. The trusted computing device of claim 12, wherein:
the request to verify comprises an indication of the first computing device and the second computing device; and
the instructions, when executed by the one or more processors, cause the trusted computing device to:
process the indication of the first computing device and the second computing device to verify that the first key is valid; and
in response to verifying that the first key is valid, send, to the first computing device, a confirmation that the first key is valid.

14. The trusted computing device of claim 12, wherein:
the request to verify comprises an indication of a selected type of key usage; and
the instructions, when executed by the one or more processors, cause the trusted computing device to:
process the indication of the selected type of key usage to verify that the first key is valid; and
in response to verifying that the first key is valid, send, to the first computing device, a confirmation that the first key is valid.

15. A system comprising:
a first computing device;
a second computing device; and
a trusted computing device;
wherein the first computing device comprises:
one or more first processors; and
first memory storing instructions that, when executed by the one or more first processors, cause the first computing device to:
send, to the second computing device, a first request to establish a secure communication between the first computing device and the second computing device;
send, to the trusted computing device, and based on a received response to the first request, a second request to establish the secure communication between the first computing device and the second computing device;
process a first key of a plurality of keys received from the trusted computing device, and a type of key usage for the first key, to establish the secure communication between the first computing device and the second computing device; and
send, to the trusted computing device, verification of an establishment of the secure communication based on the first key and the type of key usage of the first key;
wherein the second computing device comprises:
one or more second processors; and
second memory storing instructions that, when executed by the one or more second processors, cause the second computing device to:
send, to the first computing device, the response to the first request; and
wherein the trusted computing device comprises:
one or more third processors; and
third memory storing instructions that, when executed by the one or more third processors, cause the trusted computing device to:
send, to the first computing device:
an indication of the plurality of keys; and
an indication of a type of key usage for each of the plurality of keys, wherein each of the plurality of keys has a different type of key usage.

16. The system of claim 15, wherein the first key is usage-specific and device pair-specific.

17. The system of claim 15, wherein the instructions stored in the first memory, when executed by the one or more first processors, cause the first computing device to:
send, to the trusted computing device, a request for verification that the first key is valid; and
process the first key of the plurality of keys received from the trusted computing device, and the type of key usage for the first key, to establish the secure communication in response to receiving a confirmation that the first key is valid.

18. The system of claim 17, wherein the request for verification comprises an indication of the first computing device, the second computing device, and the type of key usage of the first key.

19. The system of claim 17, wherein the request for verification comprises an indication of a last known datum:
received by the first computing device;
from the trusted computing device; and
for a pairing of the first computing device and the second computing device.

20. The system of claim 15, wherein the instructions stored in the third memory, when executed by the one or more third processors, cause the trusted computing device to:
send, to the first computing device, an instruction to change the type of key usage of the first key.

21. The system of claim 15, wherein the instructions stored in the first memory, when executed by the one or more first processors, cause the first computing device to:
process an indication of a replacement key, received when the first key is no longer valid, to establish a second secure communication between the first computing device and the second computing device.

22. The system of claim 15, wherein the first key of the plurality of keys is assigned to a group of three or more devices for one or more secure communications, wherein the first computing device and the second computing device are in the group.

23. The system of claim 15, wherein the instructions stored in the third memory, when executed by the one or more third processors, cause the trusted computing device to send, to the first computing device, the indication of the plurality of keys and the indication of the type of key usage for each of the plurality of keys, in response to the trusted computing device receiving, from the first computing device, a request to verify that one or more of the plurality of keys is valid.

24. The system of claim 15, wherein the instructions stored in the first memory, when executed by the one or more first processors, cause the first computing device to:
send, to the trusted computing device, a request to verify that the first key of the plurality of keys is valid.

25. The system of claim 24, wherein:
the request to verify comprises an indication of the first computing device and the second computing device, and
the instructions stored in the third memory, when executed by the one or more third processors, cause the trusted computing device to:

process the indication of the first computing device and the second computing device to verify that the first key is valid; and in response to verifying that the first key is valid, send, to the first computing device, a confirmation that the first key is valid.

26. The system of claim 24, wherein:

the request to verify comprises an indication of a selected type of key usage, and the instructions stored in the third memory, when executed by the one or more third processors, cause the trusted computing device to:

process the indication of the selected type of key usage to verify that the first key is valid; and in response to verifying that the first key is valid, send, to the first computing device, a confirmation that the first key is valid.

27. A non-transitory computer-readable medium storing instructions that, when executed by one or more processors, cause a first computing device to:

send, to a second computing device, a first request to establish a secure communication between the first computing device and the second computing device;

receive, from the second computing device, a response to the first request;

send, to a trusted computing device and based on the response to the first request, a second request to establish the secure communication between the first computing device and the second computing device;

receive, from the trusted computing device:

an indication of a plurality of keys; and an indication of a type of key usage for each of the plurality of keys, wherein each of the plurality of keys has a different type of key usage;

process, a first key of the plurality of keys and a type of key usage for the first key, to establish the secure communication between the first computing device and the second computing device; and send, to the trusted computing device, verification of an establishment of the secure communication based on the first key and the type of key usage of the first key.

28. The non-transitory computer-readable medium of claim 27, wherein the first key is usage-specific and device pair-specific.

29. The non-transitory computer-readable medium of claim 27, wherein the instructions, when executed by the one or more processors, cause the first computing device to:

send to the trusted computing device a request for verification that the first key is valid; and process, the first key of the plurality of keys and the type of key usage for the first key, to establish the secure communication in response to receiving a confirmation that the first key is valid.

30. The non-transitory computer-readable medium of claim 29, wherein the request for verification comprises an indication of the first computing device, the second computing device, and the type of key usage of the first key.

31. The non-transitory computer-readable medium of claim 29, wherein the request for verification comprises an indication of a last known datum:

received by the first computing device;

from the trusted computing device; and for a pairing of the first computing device and the second computing device.

32. The non-transitory computer-readable medium of claim 27, wherein the instructions, when executed by the one or more processors, cause the first computing device to:

process an instruction received from the trusted computing device to change the type of key usage of the first key.

33. The non-transitory computer-readable medium of claim 27, wherein the instructions, when executed by the one or more processors, cause the first computing device to:

when the first key is no longer valid, process a received indication of a replacement key to establish a second secure communication between the first computing device and the second computing device.

* * * * *

UNITED STATES PATENT AND TRADEMARK OFFICE
CERTIFICATE OF CORRECTION

PATENT NO. : 10,587,593 B2  
APPLICATION NO. : 15/911330  
DATED : March 10, 2020  
INVENTOR(S) : Davoust et al.

Page 1 of 1

It is certified that error appears in the above-identified patent and that said Letters Patent is hereby corrected as shown below:

In the Specification

Column 9, Detailed Description, Line 39:  
Please delete "103." and insert --105.--

Column 9, Detailed Description, Line 42:  
Please delete "103" and insert --105--

Column 9, Detailed Description, Line 44:  
Please delete "103" and insert --105--

Column 10, Detailed Description, Line 5:  
Please delete "105" and insert --104--

Column 10, Detailed Description, Line 7:  
Please delete "104," and insert --105--

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*